(12) United States Patent
Wolschlager et al.

(10) Patent No.: US 7,750,625 B2
(45) Date of Patent: Jul. 6, 2010

(54) LINEAR POSITION SENSOR

(75) Inventors: Kevin Wolschlager, Elkhart, IN (US);
Markus C. Carrison, Goshen, IN (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 58 days.

(21) Appl. No.: 12/039,154

(22) Filed: Feb. 28, 2008

(65) Prior Publication Data

US 2008/0204006 A1 Aug. 28, 2008

Related U.S. Application Data

(60) Provisional application No. 60/892,032, filed on Feb. 28, 2007.

(51) Int. Cl.
*G01B 7/14* (2006.01)
(52) U.S. Cl. .............................. 324/207.24; 324/207.26
(58) Field of Classification Search ............. 324/207.2, 324/207.21, 207.24–207.26, 251–252; 338/32 R, 338/32 H; 123/612, 617
See application file for complete search history.

(56) References Cited

U.S. PATENT DOCUMENTS

2001/0015642 A1* 8/2001 Fischer et al. ............. 324/207.2
2005/0046416 A1* 3/2005 Harris .................. 324/207.24
2005/0206372 A1 9/2005 Ratnaparkhi
2008/0012554 A1* 1/2008 Babin et al. ............. 324/207.25
2008/0041145 A1* 2/2008 Cole .......................... 73/116

FOREIGN PATENT DOCUMENTS

EP 0943891 9/1999
EP 1211476 6/2002

OTHER PUBLICATIONS

International Search Report and Written Opinion mailed on Jul. 2, 2008.

* cited by examiner

*Primary Examiner*—Bot L LeDynh

(57) ABSTRACT

A sensor assembly for measuring a linear position includes a slider having a rack gear that engages a pinion gear. The pinion gear is rotatable relative to the slider responsive to linear movement. The pinion gear supports a permanent magnet that generates a magnetic field. Changes in the magnetic field caused by rotation of the pinion gear are sensed by a magnetic field sensor. Signals from the magnetic field sensor are indicative of a rotation of pinion gear and correspond to linear movement of the slider.

21 Claims, 3 Drawing Sheets

LINEAR POSITION SENSOR

CROSS REFERENCE TO RELATED APPLICATION

The application claims priority to U.S. Provisional Application No. 60/892,032 which was filed on Feb. 28, 2007.

BACKGROUND OF THE INVENTION

This invention generally relates to a linear position sensor. More particularly, this invention relates to a linear position sensor that utilizes a rotating signal generator and a sensor.

Typically, the linear position of a linear moving element is determined by a linear sensor orientated to determine movement along a linear path. Accurate measurement of a linear position is complicated by the length of any stroke and the distance away from a sensor or other electronic means of sensing movement reduces its effectiveness. Further, linear position sensors are typically accurate within only limited ranges.

Accordingly, it is desirable to design an inexpensive, reliable and accurate linear position sensor.

SUMMARY OF THE INVENTION

An example linear position sensor includes a sliding member that is movable linearly that includes a rack that drives a pinion gear.

The slider moves along a linear path and includes the rack gear that engages and drives the pinion gear. The pinion gear rotates relative to the rack and includes a diametrically polarized permanent magnet. The permanent magnet rotates with the pinion gear and the rotation of the generated magnetic field is measured by a magnetic field sensor that is disposed proximate the pinion gear. The pinion gear is supported on housing relative to the slider and rotates responsive to linear movement. Accordingly, rotational measurements correspond to linear movement of the slider and therefore provide the desired measurement of the linear stroke. Accordingly, the example linear position sensor provides an economical, reliable linear position sensor.

These and other features of the present invention can be best understood from the following specification and drawings, the following of which is a brief description.

DETAILED DESCRIPTION OF THE PREFERRED EMBODIMENT

Figure 1:
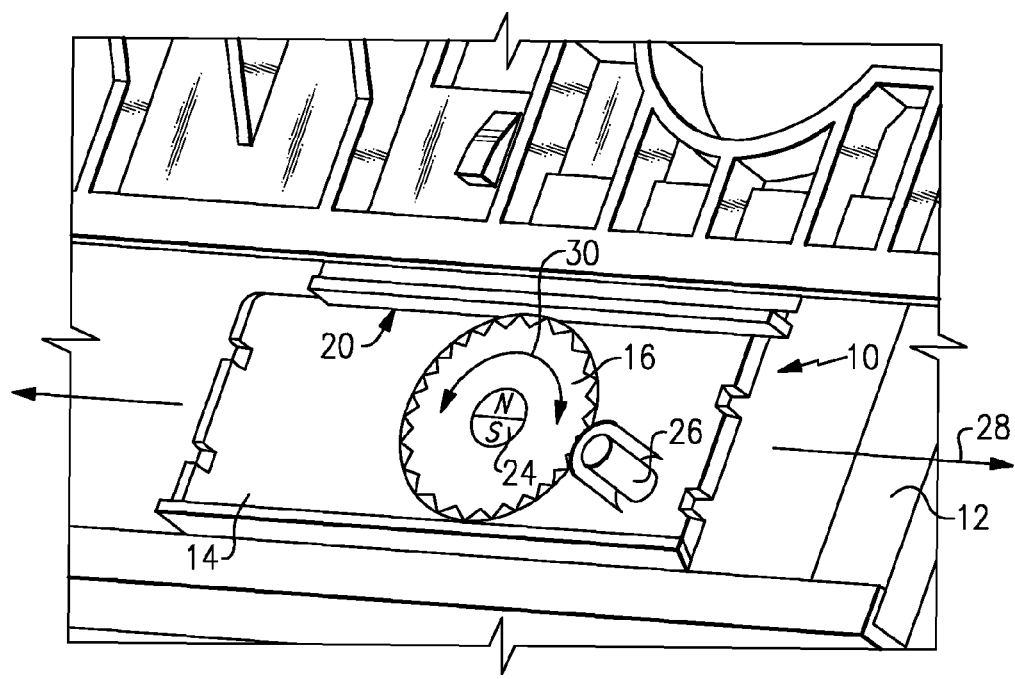
FIG. 1 is a perspective view of an example linear position sensor.

Referring to FIG. 1, the example linear position sensor 10 includes a slider 14 that is supported within a housing 12. The slider 14 includes a rack gear portion 20. The rack gear portion 20 is engaged with a pinion gear 16. The pinion gear 16 floats within an opening 22 of the housing 12. Thereby, the pinion 16 rotates relative to the slider 14 in response to movement of the slider 14 along a linear path 28.

Figure 2:
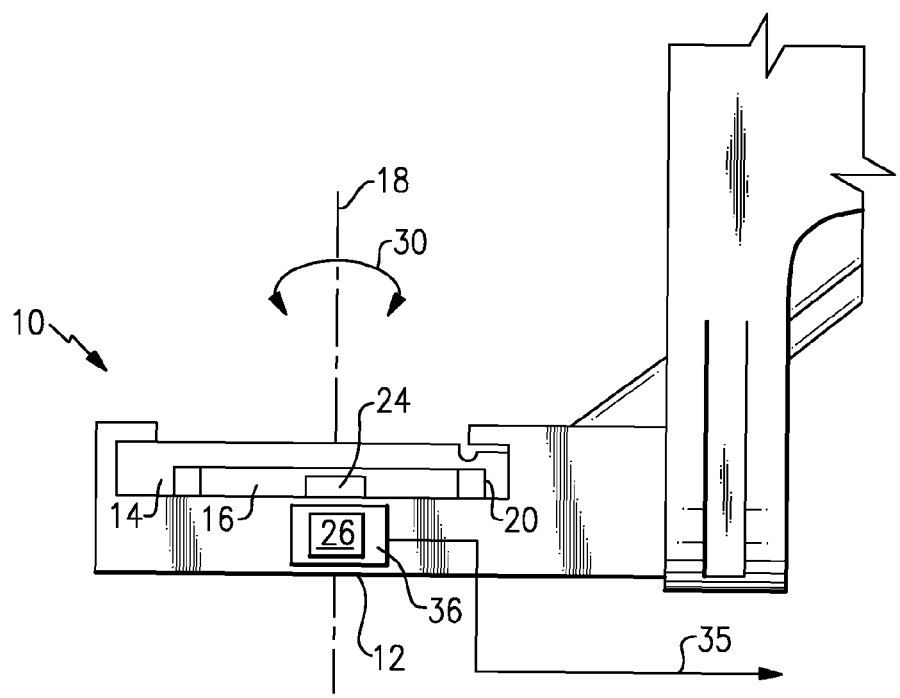
FIG. 2 is a side cross-sectional view of the example linear position sensor.

The pinion gear 16 includes teeth that engage the rack gear 20. Upon linear movement of the slider 14, the pinion gear 16 rotates. Rotation of the pinion gear 16 is proportional to linear movement indicated by arrow 28. A permanent magnet 24 is disposed within the pinion gear 16 and rotates with the pinion gear 16. Rotation of the permanent magnet 24 is sensed by a magnetic field sensor 26 (FIG. 2). The example magnetic field sensor 26 is supported on the housing 12 proximate to the pinion gear 16 and permanent magnet 24.

Referring to FIG. 2, the example magnetic field sensor 26 is a Hall Effect sensor that is mounted within the housing 12 proximate to the pinion gear 16 and thereby the permanent magnet 24. As appreciated, the permanent magnet 24 and Hall Effect sensor 26 are only one means in which rotation of the pinion gear 16 can be measured. Other sensors and magnetic field devices as are known to a worker skilled in the art would also be within the contemplation of this invention.

Figure 2A:
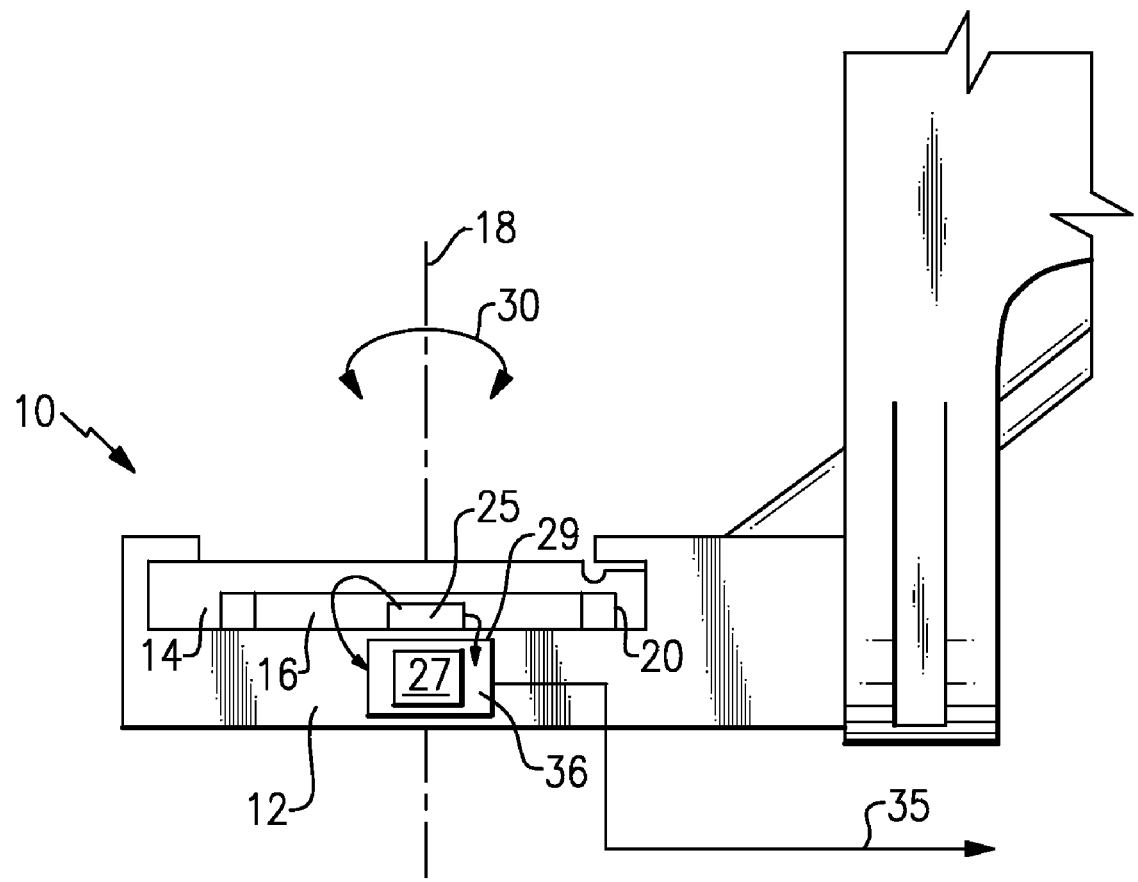
FIG. 2A is a cross-sectional view of the example linear position sensor including an example inductive sensing system.

Referring to FIG. 2A, an inductive sensing target 25 is supported on the pinion gear 16 and an inductive sensing device 27 is supported relative to the sensing target 25. The target 25 provides a signal 29 indicative of a relative position between the target 25 and the sensing device 27. The relative position between the sensing device 27 and the target 25 is in turn utilized to determine the rotational position of the pinion gear 16.

Referring back to FIG. 2, the magnetic field sensor 26 generates a signal and a controller 36 utilizes the measurement of rotation of the pinion gear 16 to determine the linear position or movement of the slider 14. The example magnetic field sensor 26 and controller are 36 are part of the same unit. However, other controller magnetic field sensor configurations are within the contemplation of this invention. Because the pinion gear 16 rotates about an axis 18, the distance between the magnet 24 and the Hall Effect sensor 26 does not change. The permanent magnet 24 is diametrically charged to provide a specific north and south pole. The magnetic field sensor 26 measures the changes in the magnetic field caused by rotation by this permanent magnet 24.

The pinion gear 16 is supported within the housing 12 within an opening 22 of the housing 12. The opening 22 supports the pinion gear 16 in that it provides a fixed orientation in which the pinion gear 16 rotates. However, the pinion gear 16 is not mechanically connected to the housing 12 and floats and rotates within the opening 22. In other words, the pinion gear 16 rotates relative to the slider 14. The slider 14 includes the rack gear 20 and includes a plurality of teeth that engage to the teeth of the pinion gear 16. Linear movement of the slider 14 causes rotation of the pinion gear 16 relative to that slider 14. The relative rotation of the pinion gear 16 about the axis 18 is sensed by the magnetic field sensor 26.

Figure 3:
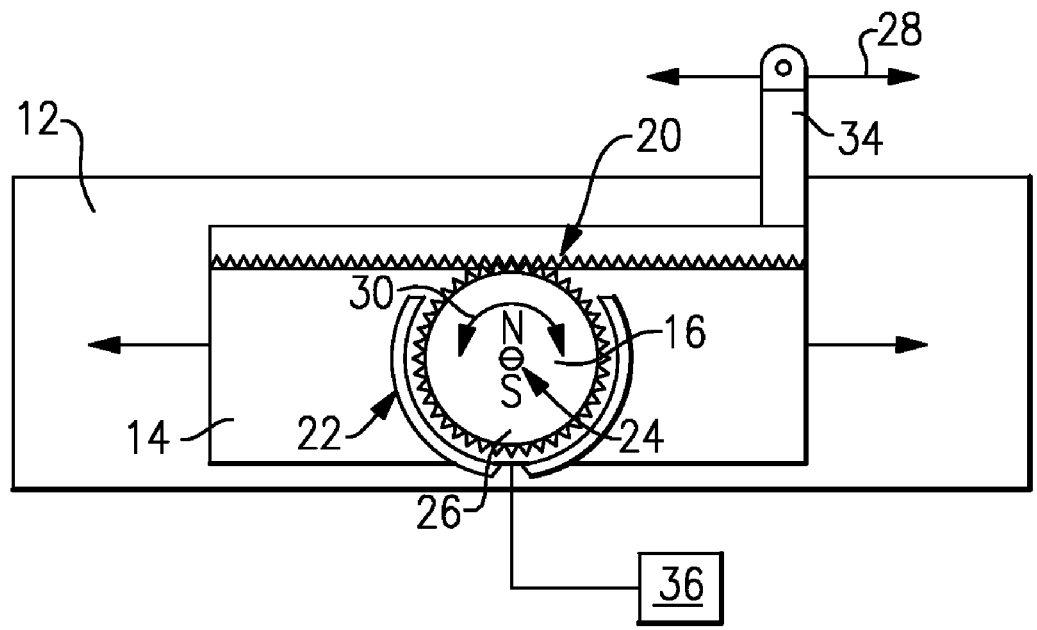
FIG. 3 is a schematic view of the example linear position sensor in a first position.
Figure 4:
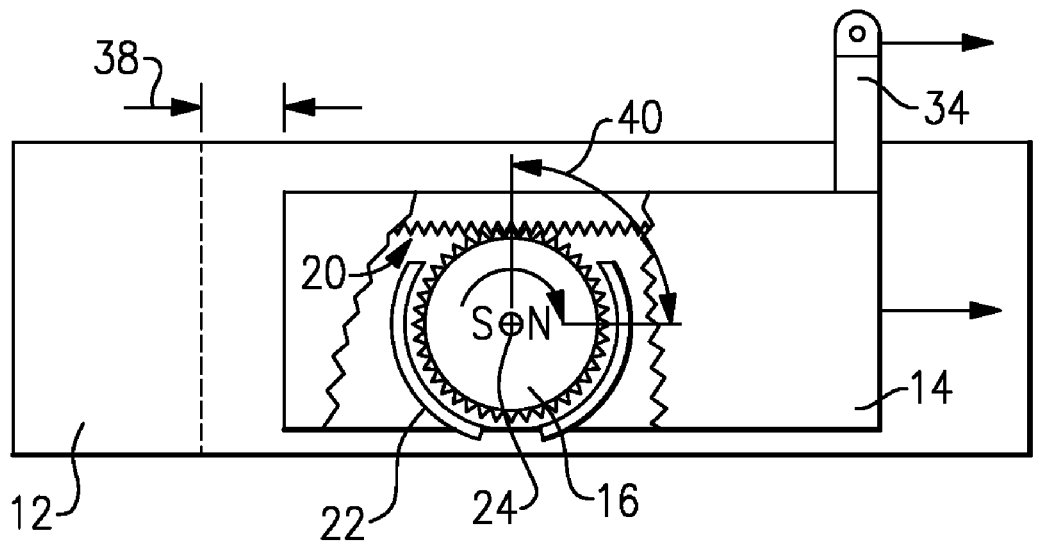
FIG. 4 is another schematic view of the example linear position sensor in a second position.

Referring to FIGS. 3 and 4, the example linear position sensor 10 is shown in a first position with the pinion gear 16 supported with the opening 22 of the housing 12. The slider 14, in this example, includes a tab 34. The tab 34 is engaged or attached to the element that is moving linearly in which the linear position 10 information is desired. Rotation of the pinion gear 16 about the axis 18 occurs responsive to the movement of the slider 14 in the linear direction. The signals provided by the magnetic field sensor 26 are converted to linear measurement by the controller 36. As appreciated the Hall Sensor and the controller can be any controller or device that can be programmed to make the desired conversions from rotational movement to linear movement. A signal 35 from the controller can then be transmitted as is desired.

The outer circumference of the pinion 16 corresponds to a desired linear stroke that is desired to be measured. Because the pinion gear 16 includes a circumference that is equal the desired linear stroke, the linear distance corresponds directly to rotation of the pinion gear 16. As appreciated, other proportions between the linear stroke and the pinion gear 16 are within the contemplation of this invention and could be utilized depending on application specific requirements.

Referring to FIG. 4, the slider 14 is shown moved a linear distance 38. The linear distance 38 causes rotation of the pinion gear 16, a rotational distance 40. This rotational distance 40 causes rotation of the magnet 24 which in turn causes a change in the magnetic field that is sensed by the magnetic field sensor 26. This change in the magnetic field is generated by rotation of the pinion 16 that is in turn generated by movement of the slider 14. Movement of the slider 14 causes rotation of the pinion gear 16 because it is engaged to the rack gear 20. The rack gear 20 moves with the slider 14 and because the pinion 16 is not engaged to the slider 14, the pinion 16 is able to rotate freely relative to the slider 14 and thereby provide the corresponding rotational movement 40 that corresponds with the linear stroke 38.

Accordingly, the linear position sensor 10 provides a simple and effective means of determining a linear position and movement of the linearly moving member without the problems associated with other conventional linear position sensors.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A linear position sensor assembly comprising:
   a first member movable along a linear path;
   a second member engaged to the first member and rotatable in proportion to movement of the first member, the second member held in a desired linear position by a structure surrounding an outer periphery of the second member;
   a signal generator mounted to the second member; and
   a sensor proximate the second member for sensing a rotational position of the signal generator.

2. The assembly as recited in claim 1, wherein the signal generator comprises a magnetic field generating member and the sensor comprises a magnetic field sensor.

3. The assembly as recited in claim 2, wherein the magnetic field sensor generates a signal indicative of a position of the first member along the linear path.

4. A linear position sensor assembly comprising:
   a first member movable along a linear path;
   a second member rotatable in proportion to movement of the first member;
   a housing including a constraining structure surrounding an outer periphery of the second member for holding the second member in a desired position;
   a signal generator mounted for rotation with the second member; and
   a sensor proximate the second member for sensing a rotational position of the signal generator, wherein the first member and the second member include complementary engaging teeth for coupling linear movement of the first member to rotational movement of the second member.

5. The assembly as recited in claim 1, wherein the second member comprises a gear supported relative to the first member and rotatable about the axis.

6. The assembly as recited in claim 2, wherein the magnetic field sensor is supported in a fixed position relative to the gear.

7. The assembly as recited in claim 2, wherein the magnetic field generator comprises a permanent magnet.

8. The assembly as recited in claim 1, wherein the signal generator comprises an inductive target and the sensor comprises an inductive sensor for sensing a relative position between the inductive target and the inductive sensor.

9. The assembly as recited in claim 1, wherein the first member comprises a slider that moves along a desired linear path and the second member is a pinion gear supported relative to the slider that is rotatable responsive to linear movement of the slider a rotational amount corresponding to the linear movement of the slider.

10. A sensor assembly for measuring a linear position comprising:
    a housing including an constraining space;
    a slider including a rack gear movable along a linear path relative to the housing;
    a pinion gear supported within the constraining space of the housing and driven by the rack gear, the pinion gear rotatable relative to the slider responsive to linear movement, the pinion gear held in a desired linear position by the constraining space of the housing;
    a magnetic field generator mounted to the pinion gear; and
    a magnetic field sensor mounted proximate the pinion gear for generating a signal indicative of a rotational position of the pinion gear.

11. The assembly as recited in claim 10, wherein the magnetic field generator is disposed within the pinion gear along an axis of rotation.

12. The assembly as recited in claim 10, wherein the magnetic field sensor is supported on the housing.

13. The assembly as recited in claim 12, wherein the rotational position of the pinion gear is indicative of a linear position of the slider.

14. The assembly as recited in claim 10, wherein the housing includes an opening within which is disposed the pinion gear.

15. The assembly as recited in claim 10, wherein the magnetic field sensor generates a signal indicative of rotation of the pinion gear that is converted to a linear distance of movement.

16. A method of determining a linear position of a linearly moving member comprising the steps of:
    supporting a pinion gear relative to a linearly movable slider;
    moving the slider linearly responsive to movement of the linear moving member rotating a pinion gear free of any shaft responsive to linear movement of the slider while holding the pinion gear in a desired linear position free of any fixed connection to the slider, the housing or a shaft;
    sensing rotational movement of a signal generator mounted to the pinion gear; and
    determining the linear position according to a relationship between rotation of the signal generator mounted to the pinion gear and linear movement of the slider.

17. The method as recited in claim 16, including the step of providing an outer circumference of the pinion gear equal to a desired linear movement.

18. The method as recited in claim 17, including mounting the magnetic field generator within the pinion gear along the axis and measuring a rotational position of the pinion gear by sensing changes in a magnetic field generated by the magnetic field generator.

19. The method as recited in claim 18, including a magnetic field sensor supported relative to the pinion gear and sensing the rotational movement of the magnetic field with the magnetic field sensor.

20. The method as recited in claim 16, wherein the step of sensing rotational movement of the pinion gear includes sensing a position of an inductive target on the pinion gear with an inductive sensor and determining rotational movement based on the relative position between the inductive target and the inductive sensor.

21. The assembly as recited in claim 1, wherein the second member comprises a pinion gear and the structure comprises a housing defining an opening within which the pinion gear rotates.

* * * * *